United States Patent
Snyder et al.

(10) Patent No.: US 9,796,056 B2
(45) Date of Patent: Oct. 24, 2017

(54) POPCORN POPPING KETTLE AND STUD RETAINER ASSEMBLY

(71) Applicant: Gold Medal Products Company, Cincinnati, OH (US)

(72) Inventors: Steven A. Snyder, Loveland, OH (US); John J. Ryan, Independence, KY (US)

(73) Assignee: Gold Medal Products Company, Cincinnati, OH (US)

( * ) Notice: Subject to any disclaimer, the term of this patent is extended or adjusted under 35 U.S.C. 154(b) by 1266 days.

(21) Appl. No.: 13/790,793

(22) Filed: Mar. 8, 2013

(65) Prior Publication Data
US 2014/0251154 A1   Sep. 11, 2014

(51) Int. Cl.
*A23L 1/18* (2006.01)
*B23P 11/00* (2006.01)
*A23L 7/187* (2016.01)

(52) U.S. Cl.
CPC .............. *B23P 11/00* (2013.01); *A23L 7/187* (2016.08); *Y10T 29/49948* (2015.01)

(58) Field of Classification Search
CPC .... B23P 11/00; Y10T 29/49948; A23L 7/187; A23L 1/1815; A47J 37/0704; A47J 39/006; A47J 27/004; H05B 6/12; H05B 3/00; H05B 3/748; H05B 3/16; H01L 21/67115; A45C 11/20
USPC .. 99/323.5, 323.9, 447, 323.6, 323.7, 323.8, 99/323.11; 219/621, 405, 385, 386, 387, 219/466.1, 465.1, 436, 438, 542
See application file for complete search history.

(56) References Cited

U.S. PATENT DOCUMENTS

| | | | |
|---|---|---|---|
| 1,792,390 A | 2/1931 | Okamoto | |
| 2,748,906 A | 6/1956 | Flora | |
| 2,875,805 A | 3/1959 | Flora | |
| 4,270,067 A * | 5/1981 | Thomas | H05B 3/50 |
| | | | 219/430 |
| 4,550,230 A | 10/1985 | Johnson | |
| 4,649,263 A * | 3/1987 | Goodlaxson | A23L 7/187 |
| | | | 219/436 |
| 5,129,693 A | 7/1992 | Schmitt | |
| 5,195,793 A | 3/1993 | Maki | |
| 5,771,779 A * | 6/1998 | Stein | G07F 17/0078 |
| | | | 99/323.7 |

(Continued)

*Primary Examiner* — Dana Ross
*Assistant Examiner* — Joseph Iskra
(74) *Attorney, Agent, or Firm* — Wood Herron & Evans LLP (57) ABSTRACT

A popcorn popping assembly includes a popcorn popping kettle having a side wall extending from a bottom wall. The assembly includes a plurality of retainers. Each of the retainers includes a bottom wall extending between a pair of side walls. The side walls and the bottom wall define a cavity, and an aperture is formed in the bottom wall and defines an essentially closed shaped periphery. The assembly includes a plurality of studs, each configured to be inserted through a respective aperture of a respective retainer. A plurality of fasteners are each configured to be received within the cavity of a retainer and couple with a stud to secure the stud to the retainer. A temperature sensor may extend through at least one of the apertures. A stud may be configured to cooperate with the temperature sensor and hold the temperature sensor in a predetermined location.

20 Claims, 6 Drawing Sheets

(56) References Cited

U.S. PATENT DOCUMENTS

| | | | |
|---|---|---|---|
| 6,283,014 B1 * | 9/2001 | Ng | A47J 27/086 |
| | | | 219/431 |
| 6,752,071 B1 | 6/2004 | Snyder | |
| 6,796,760 B1 | 9/2004 | Tanner | |
| 2008/0181745 A1 * | 7/2008 | Naik | F16B 21/09 |
| | | | 411/107 |
| 2008/0295701 A1 * | 12/2008 | Richter | A47J 27/004 |
| | | | 99/323.5 |
| 2011/0139013 A1 * | 6/2011 | Weiss | F16B 5/02 |
| | | | 99/323.9 |

\* cited by examiner

POPCORN POPPING KETTLE AND STUD RETAINER ASSEMBLY

CROSS-REFERENCE TO RELATED APPLICATION

The present application is related to co-pending U.S. Ser. No. 12/637,297, filed Dec. 14, 2009, and entitled "BOLT RETAINER FOR POPCORN POPPING KETTLES," the disclosure of which is incorporated herein by reference in its entirety.

FIELD OF THE INVENTION

The present invention relates generally to cooking appliances and, more particularly, to a kettle for use in a popcorn popping machine.

BACKGROUND OF THE INVENTION

Popcorn is often mass-produced for sale at movies and other events in commercial popcorn poppers which generally include an enclosed, transparent cabinet containing a tiltable kettle suspended above a catch area or platform. The kettle is heated and uncooked popcorn kernels are placed therein to be cooked and popped. Oil, salt and other flavorings might also be added to the kettle for flavoring the popcorn in the popping process. Once the kernels are popped, the kettle is tilted, either manually or automatically, and the popcorn spills onto the platform to be scooped up, packaged, and sold to customers. More recently, and especially as home movie theaters have gained in popularity, popcorn poppers have begun to move into the residential market for residential consumption as well. In the residential market, the residential popcorn poppers are often used to make smaller batches of popcorn than those made in commercial environments.

Figure 1:
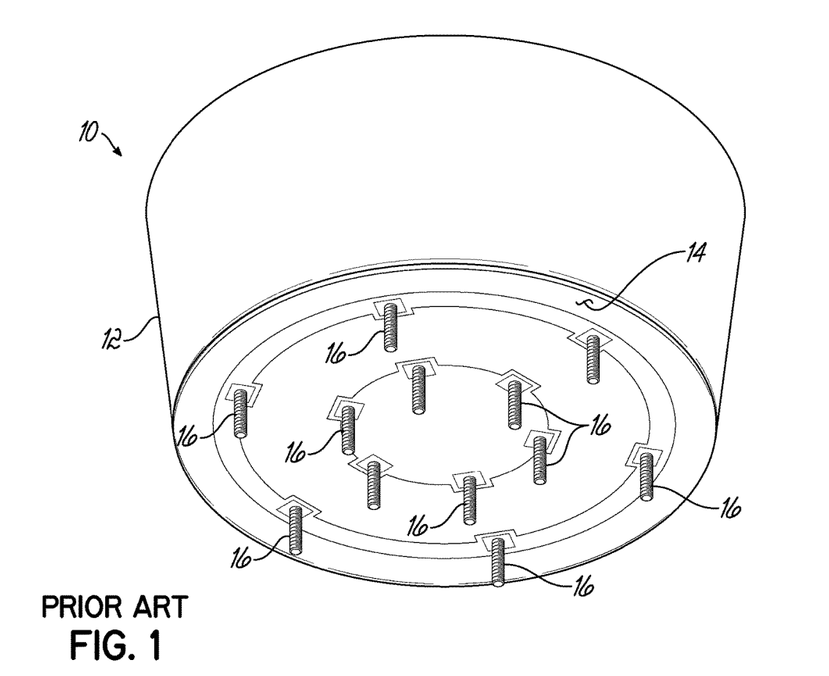
FIG. 1 is a perspective view of a conventional popcorn popping kettle.

Conventional kettles require that fasteners be welded to the bottom thereof to mount a heating element thereupon. For example, FIG. 1 illustrates a prior art kettle 10 having an upstanding side wall 12 and a bottom wall 14. A plurality of machined, threaded fasteners 16 are welded to the bottom wall 14 of the kettle 10 so that a threaded shaft or shank of each fastener 16 extends downwardly from the bottom wall 14 of the kettle 10. Each fastener 16 is machined such that its head is reduced in size and has at least four sides, with the head of each fastener being welded to the kettle bottom.

During welding of the fasteners 16 to the kettle 10, a number of defects may occur because of the small surface area with which to attach the fasteners 16 to the bottom 14 of the kettle 10. Specifically, an undercut defect often occurs, which removes a portion of the machined portion of the fastener 16 and creates a stress area in the form of a notch, which may amplify stress concentrations. A notch in a fastener 16 may eventually widen and/or otherwise continue through the fastener 16 and cause at least a portion of that fastener 16 to fall off.

A weld may also be weakened or destroyed by simply overtightening the fastener 16 during assembly. Given that the head of the fastener 16 is rigidly affixed to the kettle 10, the torque applied to the fastener 16 transmits directly to the weld. Should too much torque be applied, the weld may be forced to failure immediately or over some period of use. In either case, the failure may again cause at least a portion of the fastener 16 to fall off.

Should the weld fail such that the fastener 16 falls off, there may be a loss in structural integrity of anything held thereby, including a heating element (not shown in FIG. 1) secured to the kettle bottom by the fasteners 16. Moreover, a short circuit in the kettle heater may occur when a fastener 16 falls off, as that fastener 16 may short across the heating element, and/or wires connected to the heating element. A fastener 16 that has fallen off the bottom 14 of the kettle 10 can increase popcorn cooking times and/or decrease the efficiency of a cooking cycle. Furthermore, it is often expensive and time-consuming to fix a kettle 10 after a fastener 16 has fallen off, as the kettle 10 must be machined down to a uniform surface at the location of the missing fastener 16. The kettle 10 must then be stripped of all chrome, a new fastener 16 must be welded to the kettle bottom, and then the kettle must be re-chromed. This process often takes a number of days or even weeks and may be associated with a substantial cost due to repairs, loss of income, and lost opportunities, as a popcorn popper with no kettle is typically useless.

After assembling a conventional kettle, as is set out above, other problems may be encountered during operation of the kettle. For example, maintaining the proper temperature of a cooking surface within the kettle while popping popcorn is critical for producing quality popcorn for consumer consumption. On one hand, should the temperature of the cooking surface be too low, many kernels may fail to pop; thus producing significant waste. On the other hand, should the temperature of the cooking surface be too high, there is a risk of igniting the oil in the mixture and/or burning the popped popcorn within the kettle.

Measuring the temperature of the cooking surface so that it may be controlled, is not, however, without difficulty. The heated mixture of kernels, salt, and oil on the cooking surface is extremely abrasive. While it would be ideal to measure the temperature of the mixture directly, positioning a sensor in direct contact with such a salty, abrasive environment tends to destroy temperature sensors, such as thermocouples. For this reason, temperature sensors are often positioned on the external surface of the kettle and are thus separated from the mixture by the kettle wall. Thermal conduction through the kettle wall allows indirect measurement of the cooking surface and the mixture. The exterior surface of the kettle, particularly the bottom surface of the kettle, is often difficult to access due to its assembly with the heating element, which leaves little room in which to place a temperature sensor along this surface. In addition, the side wall of the kettle is prone to unintended contact with the remaining portion of the popcorn popping machine or even an operator during use. Thus, locating a temperature sensor to assure accurate temperature measurement is problematic.

Therefore, there is a need for an improved popcorn popping kettle that overcomes these and other shortcomings and drawbacks of known popcorn popping kettles.

SUMMARY OF THE INVENTION

The present invention overcomes the foregoing and other shortcomings and drawbacks of popcorn popping kettle assemblies heretofore known for use in a popcorn popping machine.

According to one embodiment of the present invention, a popcorn popping assembly comprises a popcorn popping kettle having an upstanding kettle side wall extending from a kettle bottom wall. The popcorn popping assembly further comprises a plurality of retainers. Each of the plurality of retainers includes a pair of spaced apart opposing side walls mounted to the kettle bottom wall, a bottom wall extending between the pair of side walls, the side walls and the bottom wall defining a cavity, and an aperture formed in the bottom wall and defining an essentially closed shaped periphery. The popcorn popping assembly further comprises a plurality of studs each configured to be inserted through a respective aperture of a respective retainer and a plurality of fasteners, each configured to be received within the cavity of a respective retainer and couple with a respective stud to secure the stud to the retainer.

According to one aspect of the present invention, a temperature sensor extends through at least one of the apertures for sensing a temperature of the popcorn popping kettle.

According to another aspect of the present invention, a stud is configured to cooperate with the temperature sensor and hold the temperature sensor in a predetermined location. The stud extends through a corresponding aperture.

According to another aspect of the present invention, at least one of the kettle bottom wall or the upstanding kettle side wall includes a region of reduced thickness and at least one of the plurality of retainers is mounted proximate the region of reduced thickness such that the temperature sensor is capable of measuring the temperature of the kettle at the region of reduced thickness.

According to another aspect of the present invention, a popcorn popping kettle assembly comprises a popcorn popping kettle having a wall and a retainer mounted to the wall of the kettle and including an aperture. A stud extends through the aperture and proximate the wall. A temperature sensor is coupled to the stud for sensing a temperature of the popcorn popping kettle.

According to another aspect of the present invention, the wall of the popcorn popping kettle assembly includes a region of reduced thickness that is thinner than the adjacent wall thickness. The retainer is mounted proximate the region of reduced thickness such that the temperature sensor is capable of measuring the temperature of the kettle at the region of reduced thickness.

According to another aspect of the present invention, the region of reduced wall thickness is from about ¼ to about ½ of the wall thickness.

According to another aspect of the present invention, the stud includes a bore and the temperature sensor is at least partially within the bore.

According to another aspect of the present invention, the retainer comprises a pair of spaced apart opposing side walls mounted to the wall, and a bottom wall extends between the pair of spaced apart side walls. The side walls and bottom wall define a cavity. The aperture is formed in the bottom wall and defines an essentially closed shaped periphery, and the temperature sensor extends through the aperture and into the cavity.

These and other advantages will be apparent in light of the following figures and detailed description.

BRIEF DESCRIPTION OF THE DRAWINGS

The accompanying drawings, which are incorporated in and constitute a part of this specification, illustrate embodiments of the present invention and, together with a general description of the present invention given above and the detailed description of the embodiments given below, serve to explain the principles of the present invention.

It should be understood that the appended drawings are not necessarily to scale, presenting a somewhat simplified representation of various preferred features illustrative of the basic principles of the present invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION OF THE INVENTION

Figure 2:
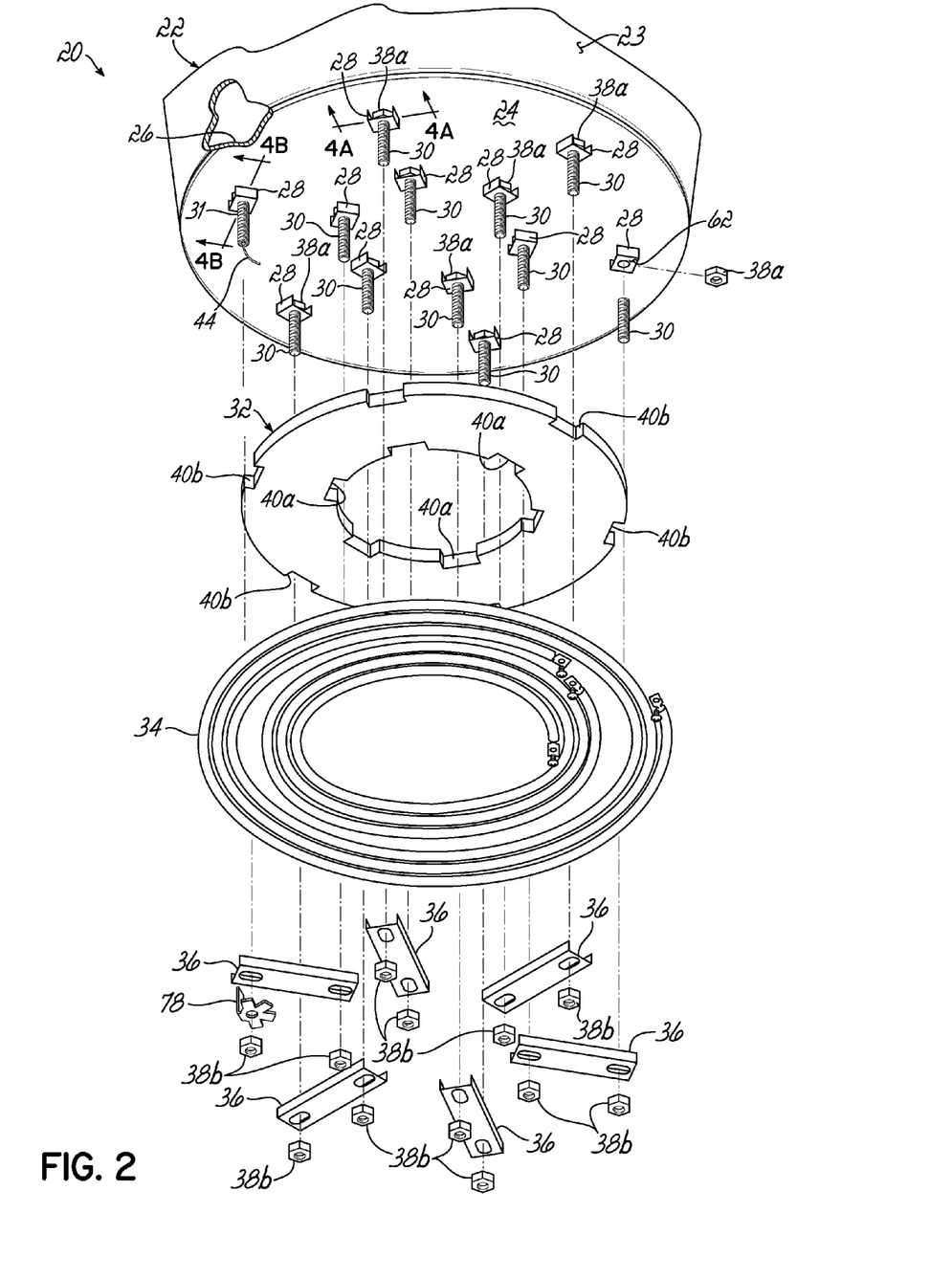
FIG. 2 is a disassembled, partially sectioned perspective view of a kettle upon which is mounted a plurality of stud retainers according to an embodiment of the present invention.

Referring now to the figures, FIG. 2 illustrates a kettle assembly 20 according to an embodiment of the present invention including a popcorn popping kettle 22 having an upstanding kettle side wall 23 and a kettle bottom wall 24 that generally define a cooking surface 26. A plurality of stud retainers 28 are mounted on the kettle 22, such as on the kettle bottom wall 24, as shown. As will be described in greater detail below, each retainer 28 may receive and secure a stud 30 or a sensor stud 31 to the kettle 22 so that the studs 30, 31 extend downwardly, away from the kettle bottom wall 24, as shown. The studs 30 and/or 31 may receive, or otherwise permit installation of, a heat transfer plate 32 and at least one heating element 34 on the kettle 22. The heat transfer plate 32 and heating element 34 may be secured to the kettle 22 through at least one retaining bar 36 that is, in turn, retained on the studs 30 and/or 31 by a plurality of fasteners 38a, 38b, for example, threaded nuts, described below.

In addition, the sensor stud 31 may include or support a temperature sensor 44, such as, a thermocouple, adjacent to the kettle 22 for sensing a temperature of the kettle 22 while popping popcorn therein. Typically, only one sensor stud 31 and its associated temperature sensor 44 will be mounted to the kettle for monitoring temperature of the kettle during a popping operation.

Advantageously, embodiments of the present invention reduce the likelihood that the kettle 22, or components thereof, are damaged during assembly and during any maintenance or repair of the assembly 20. In addition, or alternatively, embodiments of the present invention provide convenient temperature measurement of the kettle 22 during popcorn popping.

To these and other ends and with continued reference to FIG. 2, in one embodiment of the present invention, the plurality of retainers 28 may be mounted circumferentially about the center of the kettle 22 in rows radiating therefrom. In this configuration, one or more retainers 28, once secured to the kettle bottom wall 24, receive corresponding studs 30 or studs 31. As shown, the heat transfer plate 32 may be configured with a plurality of voids 40a-b (e.g., either partial or full voids) corresponding to locations on the kettle bottom wall 24 for each of the plurality of retainers 28 such that the heat transfer plate 32 contacts the kettle bottom wall 24 without contacting any of the retainers 28. In addition, the heat transfer plate 32 may include one or more expansion areas (not shown) to allow for expansion of the heat transfer plate 32 as it is heated by the heating element 34. The heat transfer plate 32 may contact the kettle 22 directly and improves heat transfer and spreads heat along the kettle bottom wall. As set forth above, the heat transfer plate 32 and heating element 34 cooperate with the studs 30 and/or sensor stud 31 that extend from the retainers 28. In one embodiment, a single retaining bar 36 may be configured for each row of studs 30 and/or sensor stud 31.

With reference to FIGS. 2, 3A, 3B, and 3C, the retainer 28 is configured to be attached to the kettle bottom wall 24 and receive the stud 30 or the sensor stud 31. In this regard, the retainer 28 may include two spaced apart opposing side walls 60a and 60b and a bottom wall 62 extending between the side walls 60a, 60b such that the retainer 28 is substantially "U" shaped with the side walls 60a, 60b defining a cavity 65 between them. As is set forth in more detail below, the top of the side walls 60a and 60b of the retainer 28 are substantially flat to provide a surface area with which to secure, for example, by welding, the retainer 28 to the kettle bottom wall 24. The bottom wall 62 includes an aperture 64 defined by the bottom wall 62. In the embodiment shown, the aperture 64 is a through-hole in the bottom wall 62 and forms an essentially closed shaped periphery. As used herein, the term "essentially closed shaped periphery" is intended to describe that the aperture 64 does not have any opening at its periphery that is sized to permit the stud 30 or 31 from disengaging from the retainer 28 through the opening in its periphery. In this regard, the bottom wall 62 may define the entire periphery of and fully enclose the aperture 64. That is, no portion of the aperture 64 may extend to or be open to an external peripheral edge of the retainer 28. In one embodiment, the aperture 64 is not a slot extending into the bottom wall 62 from a peripheral edge thereof. It will be appreciated that the configuration of the aperture 64 requires that the stud 30 and/or sensor stud 31 be inserted in an axial direction that is generally parallel to and coincident with the centerline of the aperture 64. The stud 30 and/or sensor stud 31 may not be inserted through the aperture 64 from another direction. While the exemplary embodiment shows the aperture 64 as a circular opening surrounded by the bottom wall 62, it will be appreciated that any shaped aperture may be used.

In one embodiment, the retainers 28 and the kettle 22 may be manufactured from any material suitable for use with the process of popping popcorn. However, according to an exemplary embodiment, the retainers 28 and the kettle 22 are manufactured from materials suitable for welding together. The strength and success of the weld may be further improved by forming the retainers 28 and the kettle 22 from like materials. For example, according to an exemplary embodiment, the retainers 28 and the kettle 22 may be manufactured from a stainless steel alloy and welded together. Specifically, grade 409 stainless steel may be useful for its mechanical properties, resistance to corrosion, and weldability, though other stainless steel grades may be utilized.

Figure 3A:
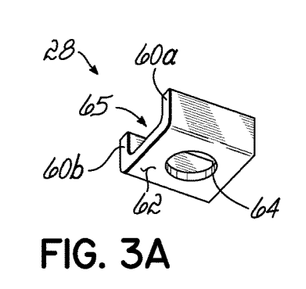
FIG. 3A is a bottom perspective view of a stud retainer according to one embodiment of the present invention.
Figure 3B:
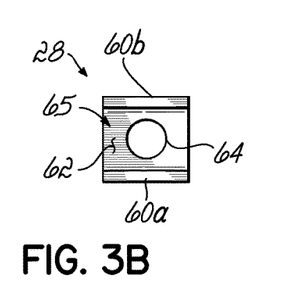
FIG. 3B is a top view of the stud retainer of FIG. 3A.
Figure 3C:
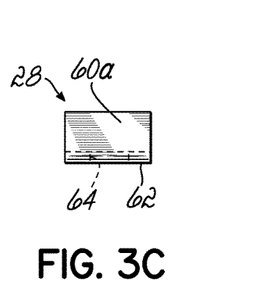
FIG. 3C is a side view of the stud retainer of FIG. 3A.

The retainer 28 may be formed by bending it into the shape illustrated in FIGS. 3A-3C described above. In one exemplary embodiment, the retainers 28 may be made from 14 gauge sheet metal. In this regard, by way of further example, the retainer 28 may be cut from sheet metal, such as, sheet metal that is about 1/16 of an inch thick to about 3/32 of an inch thick, and then bent into shape. In addition, where the aperture 64 is a circular through-hole, it may be from about 15/64 inches in diameter to about 17/64 inches in diameter. By way of further example, the aperture 64 may be about 0.26 inches in diameter.

As set forth above and shown in FIG. 2, the stud 30 and/or sensor stud 31 is secured to the kettle 22 via the retainer 28. To that end, and with specific reference to FIG. 4A, in one embodiment, the stud 30 may be threaded along its length, particularly at each end. The stud 30 is unlike a bolt in that regard. A bolt has only one end threaded and the opposing end has an enlarged head portion that is configured to cooperate with a tool, such as a wrench or nut driver. Thus, either end of the stud 30 may be inserted into the aperture 64 of the retainer 28. According to an exemplary embodiment, the stud 30 is a set screw manufactured from grade 316 stainless steel. By way of example only, the stud 30 may be one-quarter inch in diameter. In this regard, where the stud 30 includes a thread, one or both of the fasteners 38a, 38b may be ¼ inch square nuts. While the stud 30 is shown and described as having a thread extending along its length, embodiments of the present invention are not limited thereto, as the stud 30 may be configured to receive non-threaded fasteners to secure the stud 30 to the retainer 28 and the heating element 34 and heat transfer plate 32 to the stud 30. For example, other fasteners (not shown) may include pins, snap rings, or keyed shafts among others.

Figure 4A:
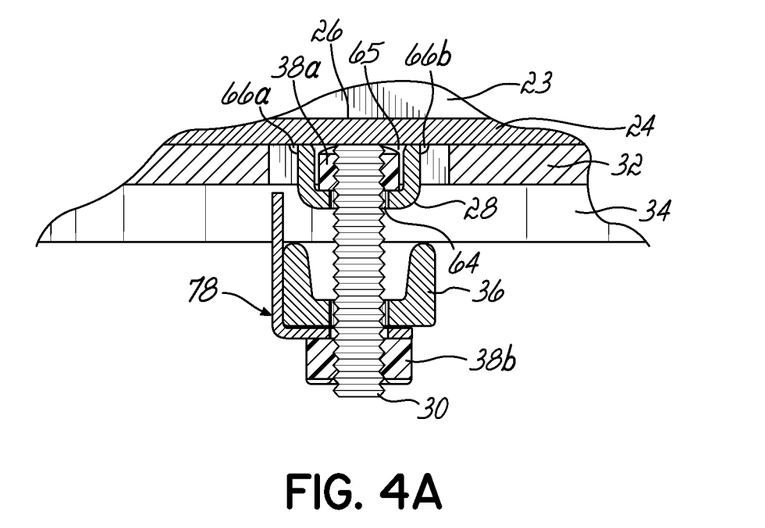
FIG. 4A is a cross-sectional view taken along line 4A-4A of FIG. 2 (when parts are fully assembled) that illustrates the interconnection of the stud retainer and other components mounted upon the kettle.

As shown in FIG. 4A, the retainer 28 may be secured to the bottom wall 24 via welds 66a, 66b. As is set forth in more detail below, the stud 30 may be inserted into the cavity 65 of the retainer 28 and secured with the fastener 38a. A second fastener 38b may be secured onto the opposing end of the stud 30. The fastener 38b may be configured to compress the retaining bar 36 into contact with the heating element 34 and heat transfer plate 32 into contact with the bottom wall 24 of the kettle 22.

Figure 4B:
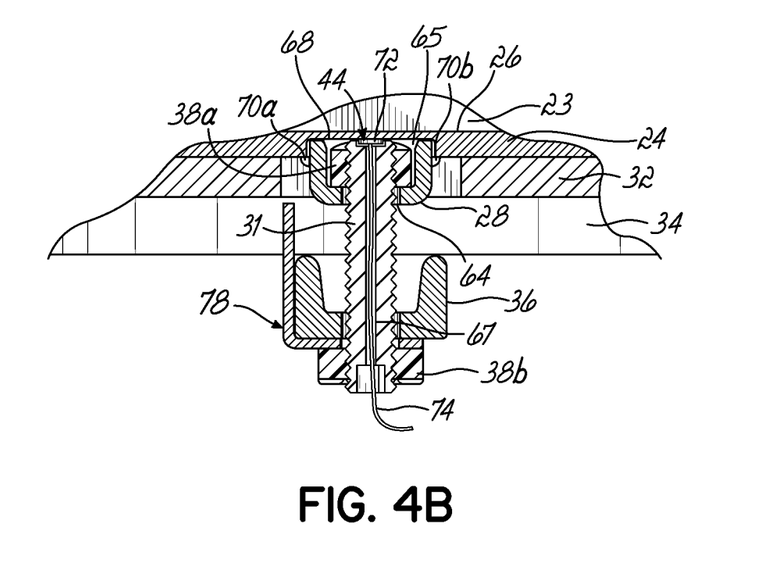
FIG. 4B is a cross-sectional view of one embodiment of the present invention taken along line 4B-4B of FIG. 2 (when parts are fully assembled) that illustrates the interconnection of the stud retainer and other components mounted upon the kettle with a temperature sensor.

To that end, in one embodiment and with reference to FIGS. 2, 4A, and 4B, the studs 30 and/or the sensor stud 31 and the associated fasteners 38b provide sufficient clamping force on the heating element 34 and heat transfer plate 32, but the studs 30 and/or sensor stud 31 will fracture or otherwise fail if excessive force is applied to the stud 30, 31. In this regard, the stud 30, 31 is designed to fail or break before the associated retainer 28 or the kettle 22 is damaged. In other words, the stud 30, 31 is designed to be a weak link.

During assembly, use, or maintenance, if an excessive load is applied to the stud 30, 31, it will break and thereby prevent breakage of, or damage to, another component, for example, the retainer 28 or the kettle 22. In one embodiment, should the stud 30, 31 break, a new stud 30, 31 may be inserted into the retainer 28 and secured to the kettle 20. This may be achieved without the need for removal of the heat transfer plate 32 and/or the heating element 34, when present. Advantageously, preventing damage to the retainer 28 and/or kettle 22 may prevent the assembly 22 from being removed from service. It will be appreciated that customers are not generally equipped to repair broken welds or defects in the kettle 22, as is set forth above. Accordingly, embodiments of the present invention improve the service life of the assembly 22 while reducing the operating costs thereof.

Further, in one embodiment shown in FIG. 4B, the assembly 20 includes the sensor stud 31 mounted to the kettle 22 as shown. The stud 31, which differs from the stud 30 in some respects, includes or is configured to cooperate with the temperature sensor 44. In this regard, the stud 31 may include a bore 67 extending axially therethrough with the electrical lead of the temperature sensor 44 extending in the bore 67. One or more retainers 28 may include the stud 31 and thereby include a corresponding one or more temperature sensors 44 for measuring the temperature at various locations on the kettle 22.

With continued reference to FIG. 4B, by way of example, the temperature sensor 44 is positioned to be in thermal contact with the kettle bottom wall 24. As it is referred to herein, positioning the temperature sensor 44 adjacent the kettle 22 refers to positioning the temperature sensor 44 at least close enough to the kettle 22 to sense the temperature of the kettle 22. For example, where the temperature sensor 44 is a thermocouple or a thermistor having a sensing tip 72, it may be necessary to position the tip 72 in direct thermal contact with a portion of the assembly 20. In this embodiment, the bore 67 may then receive an electrical lead or wire 74 attached to the tip 72. The wire 74 may then be operatively coupled to a monitoring system (not shown) for monitoring the temperature detected at the sensing tip 72. And, by way of additional example, where the temperature sensor 44 is an infrared pyrometer, or another noncontact temperature sensor, the tip 72 may be spaced from the assembly 20, but may still be in thermal contact with the assembly 20. With the temperature sensor 44, and based on known factors, such as the thickness of the kettle 22 at the location of measurement, the type of material, and others, the temperature of the cooking surface 26 may be reliably measured and controlled for popping popcorn.

While in the exemplary embodiment of FIGS. 2 and 4B the stud 31 supports the temperature sensor 44 at the kettle bottom wall 24, it will be appreciated that the temperature sensor 44 may be similarly mounted adjacent to the kettle side wall 23 (shown in FIG. 4E), or another portion of the kettle 22 as disclosed herein. When positioned on the kettle bottom wall 24, in one embodiment, the sensor stud 31 cooperates with the retaining bar 36 to support the heat transfer plate 32 and the heating element 34, much like the stud 30 in that regard. Advantageously, the sensor stud 31 and the retainer 28 may be used to support the heating element 34 for heating the kettle bottom wall 24 while the sensor stud 31 simultaneously provides access to the kettle bottom wall 24 for insertion of the temperature sensor 44. It will be appreciated, however, that the retainer 28 may be used in conjunction with the sensor stud 31 for supporting the temperature sensor 44 without the heating element 34, heat transfer plate 32, or retaining bar 36, as is shown in FIG. 4D.

In one embodiment, and with reference to FIGS. 4B-4E, in which like reference numbers indicate like features of FIG. 4A, the kettle 22 includes a region of reduced thickness 68. As shown, the region of reduced thickness 68 permits the surface on which temperature is measured to be positioned in closer proximity to the cooking surface 26. It will be appreciated that locating the point of temperature measurement closer to the cooking surface 26 improves the accuracy and responsiveness of temperature measurement, and the temperature measured may be more representative of the temperature of the cooking surface 26 than would otherwise be possible without the region of reduced thickness 68. In this regard, the region of reduced thickness 68 is generally thinner compared to the surrounding kettle bottom wall 24. The temperature sensor 44 may be positioned relative to the region of reduced thickness 68 to measure the temperature therein. The region of reduced thickness 68 may be thin enough to increase the accuracy of the adjacently placed temperature sensor 44, but thick enough to provide sufficient structural rigidity for the kettle bottom wall 24 to prevent failure, such as cracking or puncture, during use. According to an exemplary embodiment, the region of reduced thickness 68 may be from about ¼ to about ½ of the surrounding kettle wall thickness. By way of example, the region of reduced thickness 68 may be approximately ⅓ the thickness of the surrounding kettle bottom wall 24. In an exemplary embodiment, the surrounding kettle bottom wall 24 may be about 0.135 inches thick, with the region of reduced thickness 68 being about 0.063 inches thick.

Figure 4C:
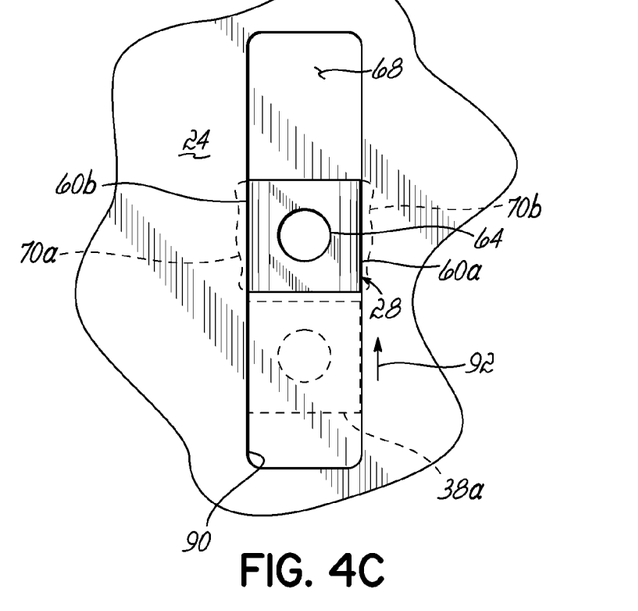
FIG. 4C is a plan view of a retainer positioned in a region of reduced thickness of a kettle bottom wall according to one embodiment of the present invention.
Figure 4D:
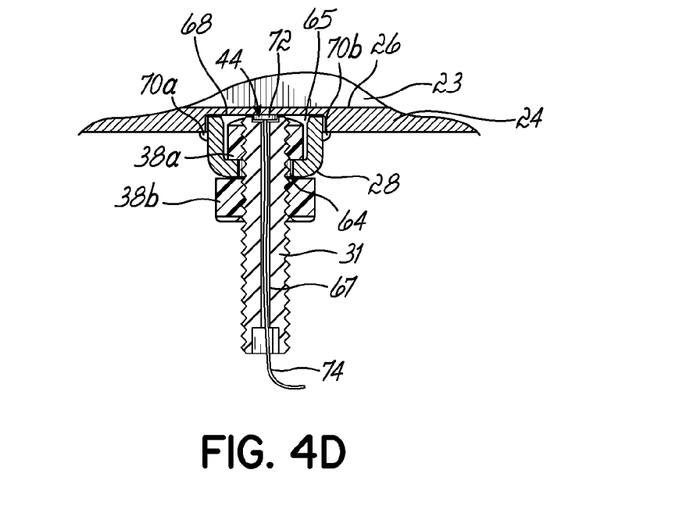
FIG. 4D is a cross-sectional view of one embodiment of the present invention that illustrates the interconnection of the stud retainer and other components mounted upon the kettle with a temperature sensor.
Figure 4E:
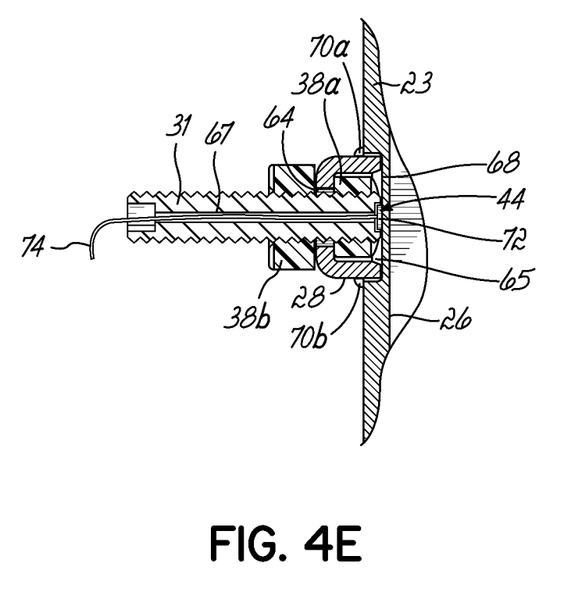
FIG. 4E is a cross-sectional view of one embodiment of the present invention that illustrates the stud retainer mounted on the kettle with a temperature sensor.

With continued reference to FIGS. 4B-4D, in one embodiment, the region of reduced thickness 68 may be formed directly into the kettle bottom wall 24 or some portion of material from the kettle bottom wall 24 may be removed, such as, by machining, to create the region of reduced thickness 68 prior to assembly. Alternatively, the region of reduced thickness 68 may be formed by initially forming a through-hole in the kettle 22 and then backfilling the hole with a filler material, such as with welding or brazing material, to provide the desired thickness.

In one embodiment, the region of reduced thickness 68 is sized to cooperate with the retainer 28. For example, and with reference to FIGS. 4C and 4D, the retainer 28 is positioned within the region of reduced thickness 68. In this manner, the sidewalls 60a, 60b are each positioned within the walls that define the region of reduced thickness 68. It will be appreciated that this construction improves the structural rigidity of the assembly between retainer 28 and the kettle 22.

In particular, the region of reduced thickness 68 may be in the form of a blind slot or pocket 90 shown in FIG. 4C. In this embodiment, the retainer 28 may be sized to slidably fit within the blind slot or pocket 90 and be rigidly affixed thereto, or welded therein, such as, by a pair of welds 70a, 70b between the side walls 60a, 60b and the kettle bottom wall 24. While the width of the blind slot 90 may be sufficient to receive the retainer 28, as shown, in one embodiment, the length of the blind slot 90 is sufficient to also receive the fastener 38a, at least at one end thereof. Once inserted into the blind slot 90, the fastener 38a may be moved in the direction of the arrow 92 into the cavity 65 of the retainer 28. In this regard, the region of reduced thickness 68 may facilitate assembly by pre-aligning and then by guiding the fastener 38a into cooperation with the retainer 28. It will be appreciated that embodiments of the present invention are not limited to the configuration of the region of reduced thickness 68 shown and described. While the region of reduced thickness 68 may be in the form of the blind slot or pocket 90, the region of reduced thickness 68 may also take another form that permits measurement of temperature at a location nearer to the cooking surface 26 than the external surface of the wall 23 or 24.

Although not shown, as an alternative to mounting the retainer 28 within the region of reduced thickness 68, the retainer 28 may be mounted proximate to the region of reduced thickness 68. In this regard, the retainer 28 need not fit within the region of reduced thickness 68 as is shown in FIGS. 4B-4D. By being proximate to the region of reduced thickness 68, the retainer 28 may be positioned relative to the region of reduced thickness 68 such that the temperature sensor 44 is capable of sensing the temperature therein. In this regard, the retainer 28 may be secured to the kettle 22 in a position that straddles the region of reduced thickness 68. In such a position, the aperture 64 may orient the temperature sensor 44 to measure the temperature within the region of reduced thickness 68.

Figure 5A:
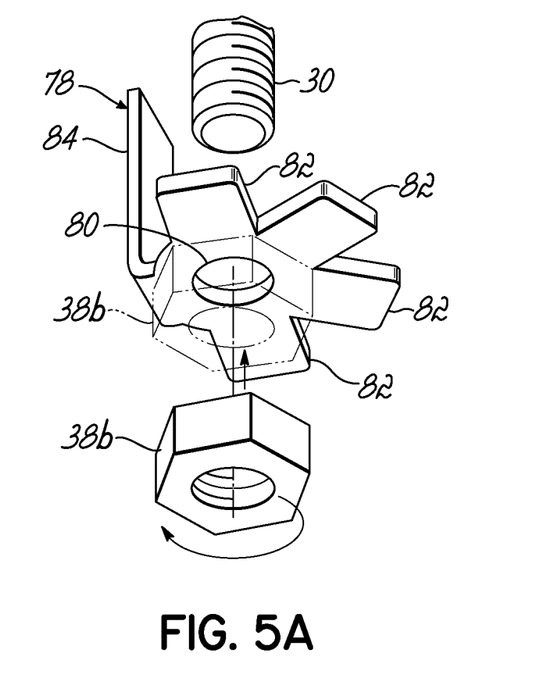
FIG. 5A is a disassembled perspective view of a nut retainer to retain a fastener on a stud according to one embodiment of the present invention.
Figure 5B:
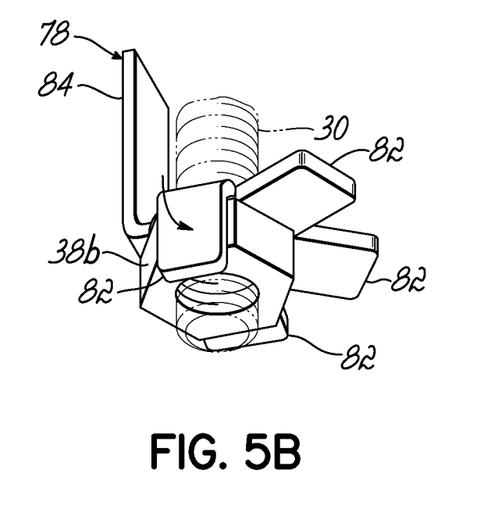
FIG. 5B is a partially assembled perspective view of the nut retainer of FIG. 5A retaining the fastener.

In one embodiment, as is depicted in FIGS. 5A and 5B, a nut retainer 78 cooperates with the stud 30, or the stud 31 (FIGS. 4B and 4D). Interconnection of the stud 30, the nut retainer 78 and the fastener 38b substantially prevents the fastener 38b from unintentionally backing off or disengaging from the stud 30. As illustrated in FIG. 5A, the nut retainer 78 may include a hole 80 sized slightly larger than the stud 30. The nut retainer 78 includes a plurality of tabs 82 located about the hole 80 that are configured to engage with the sides of the fastener 38b when they are folded downwardly as shown in FIG. 5B. The nut retainer 78 also includes an elongated support tab 84 configured to engage with the retaining bar 36 and/or the retainer 28 upon which the nut retainer 78 is mounted. The nut retainer 78 may be positioned around the stud 30 such that the support tab 84 engages with the retaining bar 36 and/or the bolt retainer 28, and then the fastener 38b may be placed around the stud 30 and tightened. After tightening the fastener 38 to provide a secure connection between the bolt retainer 28, the stud 30, the heat transfer plate 32, the heating element 34, the retaining bar 36 and/or the nut retainer 78, at least one of the tabs 82 of the nut retainer 78 may be bent or folded downwardly to engage with at least one side of the fastener 38b as illustrated in FIG. 5B to prevent the fastener 38b from moving. In this manner, the fastener 38b is maintained in its position as any twisting motion of the fastener 38b will be transferred by the tab 82 to the support tab 84, which in turn will be prevented from twisting due to its engagement with the retaining bar 36 and/or the retainer 28. As illustrated in FIGS. 5A and 5B, the nut retainer 78 includes four tabs 82. It will be appreciated that the nut retainer 78 may include more or fewer tabs 82, and that in some embodiments the nut retainer 78 includes only one tab 82.

According to one aspect of the present invention, and as set out above, the assembly 20 reduces the likelihood that the kettle 22 is damaged during assembly, use, and maintenance. For instance and with reference to FIG. 4A, during assembly, the retainer 28 may be secured to the kettle bottom wall 24, for example, by the welds 66a, 66b. The fastener 38a may be inserted or slid into the cavity 65. The stud 30 may be inserted through the aperture 64 and then secured in place with the fastener 38a. As set forth above, where the fastener 38a is a threaded nut, the stud 30 may rotatably engage the nut. The cavity 65 and the fastener 38a may be sized such that the fastener 38a slides into the cavity 65 from one side of the retainer 28 in one or more specific orientations. The fastener 38a does not pass through the aperture 64. That is, at least one dimension of the fastener 38a is larger than a dimension of the aperture 64 to prevent passage of the fastener 38a therethrough in at least one orientation. When the stud 30 or stud 31 is inserted through the aperture 64 and is rotated, the side walls 60a, 60b prevent free rotation of the fastener 38a. In this way, the stud 30, 31 may be threaded into the fastener 38a without the need for additional restraint of the fastener 38a during assembly. The stud 30 may be tightened snug against the kettle bottom wall 24 by hand thereby preventing overtightening of the stud 30. As such, no tools may be required for attachment of the stud 30, or the sensor stud 31, to the kettle 22.

In addition, in one embodiment, the connection between the fastener 38a and the stud 30, 31 reduces torque transfer to the retainer 28 and to the kettle bottom wall 24 via welds 66a, 66b, because the fastener 38a may rotate freely from the stud 30, 31 through at least a partial rotation of the stud 30, 31. In this way, torque on the stud 30, 31 is less likely to be transmitted to the fastener 38a. This is unlike the fastener 16 shown in FIG. 1 which is rigidly affixed to the kettle 10. Thus, in FIG. 1, if torque is applied to the fastener 16, the force may be sufficient to cause the fastener 16 to break away from the kettle 22.

The heat transfer plate 32 and heating element 34 may then be mounted on the stud 30 and retained in place by the retaining bar 36 and the fastener 38b. As with the fastener 38a, the fastener 38b may be hand tightened against the retaining bar 36. This assembly is repeated for each of the studs 30 and/or studs 31. Finally, using a tool, such as a socket wrench (not shown), each of the fasteners 38b may be tightened, for example, by about a ¾ turn to complete the assembly.

In the embodiments in which the stud 30, 31, as described above, are the weak link, overtightening the fastener 38b may cause the stud 30, 31 to break or fail before the retainer 28 or the kettle 22 are damaged. It will be appreciated that this breakage may result in an audible or a tactile sensation that is noticeable by the person tightening the fastener 38b. In this case, the person may make further investigation of the assembly and replace the broken stud 30, 31 as necessary.

In addition, to prevent the fastener 38b from freely rotating after assembly as set forth above, the fastener 38b may be retained in place by the nut retainer 78. Specifically, at least one side of the fastener 38b may contact the nut retainer 78 and thus be prevented from unintentional turning as described in detail above in connection with FIGS. 5A and 5B.

Those skilled in the art will recognize that the environments illustrated in FIGS. 1-5B are not intended to limit the present invention. Thus, while embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the present invention in its broader aspects is therefore not limited to the specific details, representative apparatus shown and described. Accordingly, departures may be made from such details without departing from the spirit or scope of applicants' general inventive concept.

Other modifications will be apparent to one of ordinary skill in the art. Therefore, the present invention lies in the claims hereinafter appended.

What is claimed is:

1. A popcorn popping assembly, comprising:
a popcorn popping kettle having an upstanding kettle side wall extending from a kettle bottom wall;
at least one retainer including:
a pair of spaced apart opposing side walls mounted to the kettle bottom wall;
a bottom wall extending between the pair of side walls, the side walls and the bottom wall defining a cavity; and
an aperture formed in the bottom wall and defining an essentially closed shaped periphery;
at least one stud configured to be inserted through the aperture; and
at least one fastener configured to be received within the cavity and couple with the at least one stud to secure the at least one stud to the at least one retainer.

2. The popcorn popping kettle assembly of claim 1 further including a second retainer including:
a second pair of spaced apart opposing side walls mounted to the kettle;
a second bottom wall extending between the second pair of side walls, the second side walls and the second bottom wall defining a second cavity; and
a second aperture formed in the second bottom wall and defining a second essentially closed shaped periphery; and
wherein a temperature sensor extends through the second aperture for sensing a temperature of the popcorn popping kettle.

3. The popcorn popping kettle assembly of claim 2 further including a second stud that is configured to cooperate with the temperature sensor and hold the temperature sensor in a predetermined location and wherein the second stud extends through the second aperture.

4. The popcorn popping kettle assembly of claim 2 wherein at least one of the kettle bottom wall or the upstanding kettle side wall includes a region of reduced thickness and the second retainer is mounted proximate the region of reduced thickness such that the temperature sensor is capable of measuring the temperature of the kettle at the region of reduced thickness.

5. The popcorn popping kettle assembly of claim 1 further comprising a retaining bar positioned on the at least one stud.

6. The popcorn popping kettle assembly of claim 5 further comprising at least one heating element and a heat transfer plate, the at least one heating element disposed between the kettle bottom wall and the retaining bar, and the heat transfer plate disposed between the kettle bottom wall and the at least one heating element.

7. The popcorn popping kettle assembly of claim 1 further comprising a nut retainer configured to retain the at least one fastener on at least one stud.

8. A popcorn popping kettle assembly, comprising:
a popcorn popping kettle having a wall;
a retainer mounted to the wall of the kettle and including an aperture;
a stud extending through the aperture and proximate the wall;
a temperature sensor coupled to the stud for sensing a temperature of the popcorn popping kettle; and
a fastener between the wall and the retainer for securing the stud proximate the wall of the kettle.

9. The popcorn popping kettle assembly of claim 8 wherein the wall includes a region of reduced thickness and the retainer is mounted proximate the region of reduced thickness such that the temperature sensor is capable of measuring the temperature of the kettle at the region of reduced thickness.

10. The popcorn popping kettle assembly of claim 9 wherein the wall has a wall thickness and the region of reduced thickness is from about ¼ to about ½ of the wall thickness.

11. The popcorn popping kettle assembly of claim 9 wherein the retainer is configured to support the temperature sensor in thermal contact with the region of reduced thickness.

12. The popcorn popping kettle assembly of claim 8 wherein the stud includes a bore and the temperature sensor is at least partially within the bore.

13. The popcorn popping kettle assembly of claim 8 wherein the retainer comprises:
a pair of spaced apart opposing side walls mounted to the wall; and
a bottom wall extending between the pair of spaced apart side walls, the side walls and the bottom wall defining a cavity; and wherein the aperture is formed in the bottom wall and defines an essentially closed shaped periphery and the temperature sensor extends through the aperture and into the cavity.

14. The popcorn popping kettle assembly of claim 8 wherein the stud is threaded and the fastener is a nut.

15. The popcorn popping kettle assembly of claim 8 wherein the popcorn popping kettle has an upstanding kettle side wall extending from a kettle bottom wall, the assembly further comprising:
a second retainer mounted to the kettle bottom wall of the popping kettle, the second retainer including opposing spaced apart side walls, a bottom wall extending between the spaced apart side walls, and an aperture in the bottom wall and defining an essentially closed shaped periphery, the bottom wall and the spaced apart side walls defining a second cavity;
a second stud extending through the aperture in a direction away from the kettle bottom wall; and
a second fastener received in the second cavity and cooperating with the second stud to secure the second stud to the second retainer.

16. A method of assembling a popcorn popping kettle, comprising:
securing a first retainer and a second retainer to a popcorn popping kettle having an upstanding kettle side wall extending from a kettle bottom wall, at least one of the first and second retainers being secured to the kettle bottom wall, the first and second retainers each having a pair of spaced apart opposing side walls, a bottom wall extending between the pair of side walls such that the side walls and bottom wall define a cavity, and an aperture formed in the bottom wall and defining an essentially closed shaped periphery;
inserting a first fastener into the cavity of the first retainer;
inserting a stud through the aperture of the first retainer;
securing the stud to the first fastener such that the stud extends in a direction away from the kettle bottom wall; and
inserting a temperature sensor through the aperture of the second retainer for measuring a temperature of the popcorn popping kettle.

17. The method of claim 16 wherein prior to securing the second retainer, the method further comprises:
removing at least a portion of at least one of the upstanding kettle side wall and the kettle bottom wall to form a region of reduced thickness.

18. The method of claim 17 wherein securing includes securing the second retainer proximate to the region of reduced thickness, and wherein inserting the temperature sensor includes positioning the temperature sensor adjacent to the region of reduced thickness for measuring a temperature of the kettle at the region of reduced thickness.

19. The method of claim 16 further comprising:
   installing a heat transfer plate on the stud;
   installing at least one heating element into thermal communication with the heat transfer plate; and
   securing a second fastener to the stud to couple the heat transfer plate and the heating element to the kettle.

20. The popcorn popping kettle assembly of claim 8 wherein the stud is in contact with the wall.

* * * * *